United States Patent
Rosenschild et al.

(10) Patent No.: US 11,418,978 B2
(45) Date of Patent: Aug. 16, 2022

(54) SYSTEMS AND METHODS FOR DISTRIBUTED ANTENNA SYSTEM MANAGEMENT USING MOBILE USER EQUIPMENT

(71) Applicant: CommScope Technologies LLC, Hickory, NC (US)

(72) Inventors: Klaus Uwe Rosenschild, Donauwörth (DE); Arndt Paul Pischke, Huisheim (DE)

(73) Assignee: CommScope Technologies LLC, Hickory, NC (US)

( * ) Notice: Subject to any disclaimer, the term of this patent is extended or adjusted under 35 U.S.C. 154(b) by 100 days.

(21) Appl. No.: 17/025,415

(22) Filed: Sep. 18, 2020

(65) Prior Publication Data
US 2021/0120437 A1    Apr. 22, 2021

Related U.S. Application Data

(60) Provisional application No. 62/916,650, filed on Oct. 17, 2019.

(51) Int. Cl.
*H04W 24/00* (2009.01)
*H04W 24/04* (2009.01)
(Continued)

(52) U.S. Cl.
CPC ............ *H04W 24/04* (2013.01); *H04W 8/26* (2013.01); *H04W 12/08* (2013.01); *H04W 12/71* (2021.01);
(Continued)

(58) Field of Classification Search
CPC ... H04W 88/085; H04W 24/00; H04W 64/00; H04W 16/26; H04W 4/02; H04W 4/90;
(Continued)

(56) References Cited

U.S. PATENT DOCUMENTS

| | | | | |
|---|---|---|---|---|
| 2010/0278530 A1* | 11/2010 | Kummetz | ............. | H04W 16/14 398/115 |
| 2013/0107763 A1* | 5/2013 | Uyehara | .................. | H04B 1/44 370/278 |

(Continued)

FOREIGN PATENT DOCUMENTS

| | | |
|---|---|---|
| WO | 2019027711 A1 | 2/2019 |
| WO | 2019204205 A1 | 10/2019 |
| WO | 2019219898 A1 | 11/2019 |

OTHER PUBLICATIONS

International Searching Authority, "International Search Report and Written Opinion from PCT Application No. PCT/US2020/051471", from Foreign Counterpart to U.S. Appl. No. 17/025,415, filed Dec. 23, 2020, pp. 1 through 10, Published: WO.

(Continued)

*Primary Examiner* — Joseph Arevalo
(74) *Attorney, Agent, or Firm* — Fogg & Powers LLC

(57) ABSTRACT

In one embodiment, a distributed antenna system (DAS) comprises: a master unit having downlink DAS circuitry configured to receive a base station downlink RF signal, and uplink DAS circuitry configured to transmit a base station uplink RF signal; and a plurality of remote antenna units coupled to the master unit, each configured to radiate a remote downlink RF signal from at least one antenna and to receive a remote uplink RF signal from the at least one antenna. A first remote antenna unit includes a secure DAS maintenance channel interface that includes a DAS maintenance access point. The secure DAS maintenance channel interface is communicatively coupled to a DAS maintenance channel of the DAS and communicates with a proximity detector configured to obtain a user equipment identification code from a user equipment; wherein a discoverability of the DAS maintenance access point is enabled based on the user equipment identification code.

25 Claims, 5 Drawing Sheets

(51) Int. Cl.
  *H04W 8/26* (2009.01)
  *H04W 48/16* (2009.01)
  *H04W 64/00* (2009.01)
  *H04W 24/06* (2009.01)
  *H04W 12/08* (2021.01)
  *H04W 24/10* (2009.01)
  *H04W 12/71* (2021.01)
  *H04W 92/10* (2009.01)
  *H04W 88/08* (2009.01)
  *H04W 88/12* (2009.01)

(52) U.S. Cl.
  CPC ........... *H04W 24/06* (2013.01); *H04W 24/10* (2013.01); *H04W 48/16* (2013.01); *H04W 64/00* (2013.01); *H04W 88/085* (2013.01); *H04W 88/12* (2013.01); *H04W 92/10* (2013.01)

(58) Field of Classification Search
  CPC ....... H04W 72/04; H04W 76/50; H04W 4/06; H04W 52/52; H04W 56/004; H04W 56/0055; H04W 72/042; H04W 16/04; H04W 16/06; H04W 16/12; H04W 16/24; H04W 16/28; H04W 16/32; H04W 28/0247; H04W 28/0252; H04W 28/08; H04W 56/00; H04W 72/0413; H04W 72/046; H04W 88/08
  USPC ...... 455/517, 447, 450, 78, 509, 562.1, 525, 455/7, 456.2, 422
  See application file for complete search history.

(56) References Cited

U.S. PATENT DOCUMENTS

| | | | |
|---|---|---|---|
| 2013/0150063 A1* | 6/2013 | Berlin | H04B 10/25753 455/450 |
| 2013/0188753 A1* | 7/2013 | Tarlazzi | H04J 14/0252 375/299 |
| 2014/0126914 A1* | 5/2014 | Berlin | H04B 10/25753 398/116 |
| 2017/0310437 A1 | 10/2017 | Bottari et al. | |
| 2019/0104072 A1 | 4/2019 | Kwon et al. | |
| 2019/0239200 A1 | 8/2019 | Landry et al. | |
| 2019/0268255 A1 | 8/2019 | Kazav et al. | |
| 2021/0120437 A1* | 4/2021 | Rosenschild | H04W 24/04 |

OTHER PUBLICATIONS

Corazza et al., "A machine learning approach for predictive maintenance for mobile phone service providers", International Conference on P2P, Parallel, Grid, Cloud and Internet Computing, Jan. 2017, pp. 1 through 11.

KGPCo, "Distributed Antenna Systems—Preventative Maintenance", at least as early as Sep. 5, 2019, pp. 1 through 2, https://www.bluestreampro.com/das_preventative_maintenance.html.

Verma, "How will 5G impact in-building wireless infrastructure", Jan. 9, 2019, pp. 1 through 10, https://inbuildingtech.com/5g/5g-inbuilding-wireless-infrastructure/.

Wakabayashi, "Landlording 2.0: Are you getting the most our of your building's data? (/en/blogs/landlording-2-0-are-you-getting-the-most-out-of-your-buildings-data)", Jun. 11, 2019, pp. 1 through 16, https://www.combausa.com/en/solutions?start=14.

* cited by examiner

SYSTEMS AND METHODS FOR DISTRIBUTED ANTENNA SYSTEM MANAGEMENT USING MOBILE USER EQUIPMENT

CROSS-REFERENCE TO RELATED APPLICATIONS

This U.S. Patent Applications claims priority to, and the benefit of, U.S. Provisional Patent Application No. 62/916, 650, titled "SYSTEMS AND METHODS FOR DISTRIBUTED ANTENNA SYSTEM MANAGEMENT USING MOBILE USER EQUIPMENT DEVICES" filed on Oct. 17, 2019, which is incorporated herein by reference in its entirety.

BACKGROUND

A typical distributed antenna system (DAS) includes a master unit that is communicatively coupled with a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. The wireless service provided by the base stations can include commercial cellular service and/or private or public safety wireless communications.

A newly installed DAS may undergo a number of pre-operational testing, configuration, and calibration procedures performed by technicians at the site of the DAS installation. Similar DAS management and maintenance activities performed by technicians at the site of the DAS installation may be performed from time-to-time after the DAS has entered service. As will be discussed herein there is a need for improved local management access for DAS systems.

SUMMARY

In one embodiment, a distributed antenna system (DAS) comprises: a master unit having downlink DAS circuitry configured to receive a base station downlink radio frequency signal from a base station, and uplink DAS circuitry configured to transmit a base station uplink radio frequency signal to the base station; and a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna; wherein a first remote antenna unit of the plurality of remote antenna units includes a secure DAS maintenance channel interface that includes a DAS maintenance access point, wherein the secure DAS maintenance channel interface is communicatively coupled to a DAS maintenance channel of the DAS; wherein the secure DAS maintenance channel interface communicates with a proximity detector configured to obtain a user equipment identification code from a user equipment; wherein a discoverability of the DAS maintenance access point is enabled based on the user equipment identification code.

DRAWINGS

In accordance with common practice, the various described features are not drawn to scale but are drawn to emphasize. Reference characters denote like elements throughout figures and text.

DETAILED DESCRIPTION

In the following detailed description, reference is made to the accompanying drawings that form a part hereof, and in which is shown by way of specific illustrative embodiments. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

Figure 1:
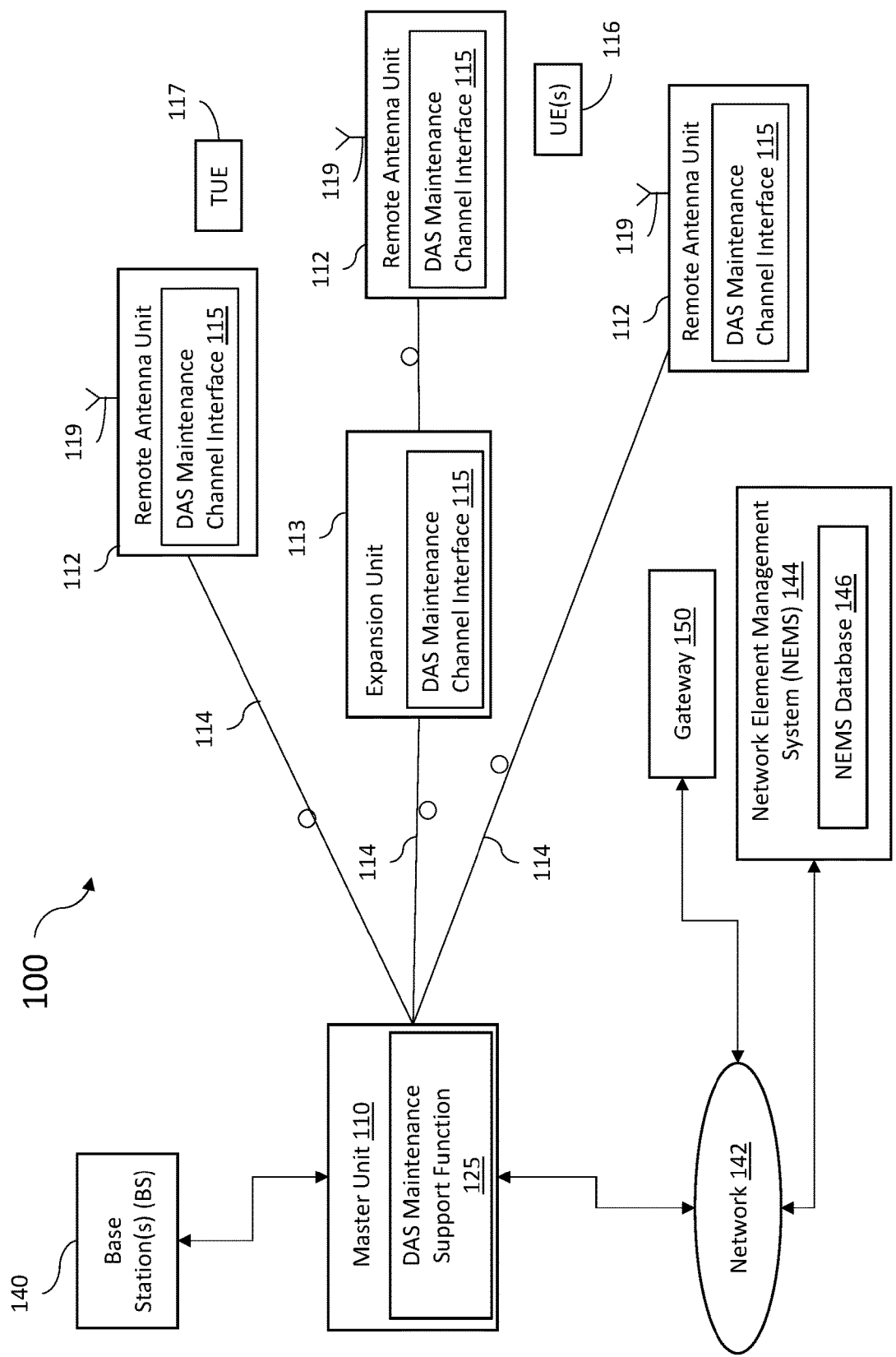
FIG. 1 is a block diagrams illustrating an example distributed antenna system embodiment.

FIG. 1 is block diagram of one exemplary embodiment of a distributed antenna system (DAS) 100 that includes circuitry that provides locally accessible operational, maintenance and diagnostic functionality which can be utilized by technicians at the DAS 100 installation site. The DAS 100 comprises a master unit 110 that is communicatively coupled to one or more remote antenna units 112 via one or more cables 114. Although the term "remote antenna unit" is used in this disclosure, those skilled in the art of distributed antenna systems would recognize "remote unit" as being an equivalent term for these elements of a DAS. Each remote antenna unit 112 can be communicatively coupled directly to the master unit 110 or indirectly via one or more other remote antenna units 112 and/or via one or more optional intermediary or expansion units 113. The master unit 110, remote antenna units 112, and expansion units 113 (if present) may be coupled together by cables 114. In FIG. 1, the cables 114 are shown as comprising optical fiber cables. However, in other embodiments, the cables may comprise optical fibers, electrical conductors (for example, twisted-pair or coaxial cables), or combinations of optical fiber and electrical conductors.

As shown in FIG. 1, in some embodiments, the master unit 110 is communicatively coupled to at least one base station 140. Base station 140 can be co-located with the master unit 110 to which it is coupled. Alternatively, a base station 140 can be located remotely from the master unit 110 to which it is coupled (for example, where the base station 140 provides base station capacity to an area beyond the coverage area of the DAS 100). In this latter case, the master unit 110 can be coupled to a donor antenna and repeater or bi-directional amplifier in order to wirelessly communicate with the remotely located base station 140. In this exemplary embodiment, the base station 140 may comprise a base station that is used to provide public and/or private safety wireless services (for example, wireless communications used by emergency services organizations (such as police, fire and emergency medical services) to prevent or respond to incidents that harm or endanger persons or property). Such base stations are also referred to here as "safety wireless service base stations" or "safety base stations." The base station 140 also can include, in addition to safety base stations, one or more base stations that are used to provide commercial cellular wireless service. Such base stations are also referred to here as "commercial wireless service base stations" or "commercial base stations."

The base station 140 can be coupled to the master unit 110 using a network of attenuators, combiners, splitters, amplifiers, filters, cross-connects, etc., (sometimes referred to collectively as a "point-of-interface" or "POI"). This network can be included in the master unit 110 and/or can be separate from the master unit 110. This is done so that, in the downlink, the desired set of RF channels output by the base station 140 can be extracted, combined, and routed to the appropriate master unit 110, and so that, in the uplink, the desired set of carriers output by the master unit 110 can be extracted, combined, and routed to the appropriate interface of each base station 140. It is to be understood, however, that this is one example and that other embodiments can be implemented in other ways.

DAS 100 may be remotely managed by a network element management system (NEMS) 144 (for example, and Operations and Maintenance Center (OMC) such as an Andrew Integrated Management and Operating System (A.I.M.O.S.)) via a network 142. In some embodiment, the NEMS 144 may include a database 146 where it stores, for example, asset and connection information about the DAS 100, historical measurement data received from sensors 138 within DAS 100, work order information comprising maintenance tasks to be performed on DAS 100, and/or other information as describes elsewhere herein. One or both of the NEMS 144 and NEMS database 146 can be implemented using one or more computers on which appropriate software is executed to perform functions of the NEMS 144 described herein. In some embodiments, network 142 may be connected to other networks such as the public Internet for example, by a gateway 150.

Figure 1A:
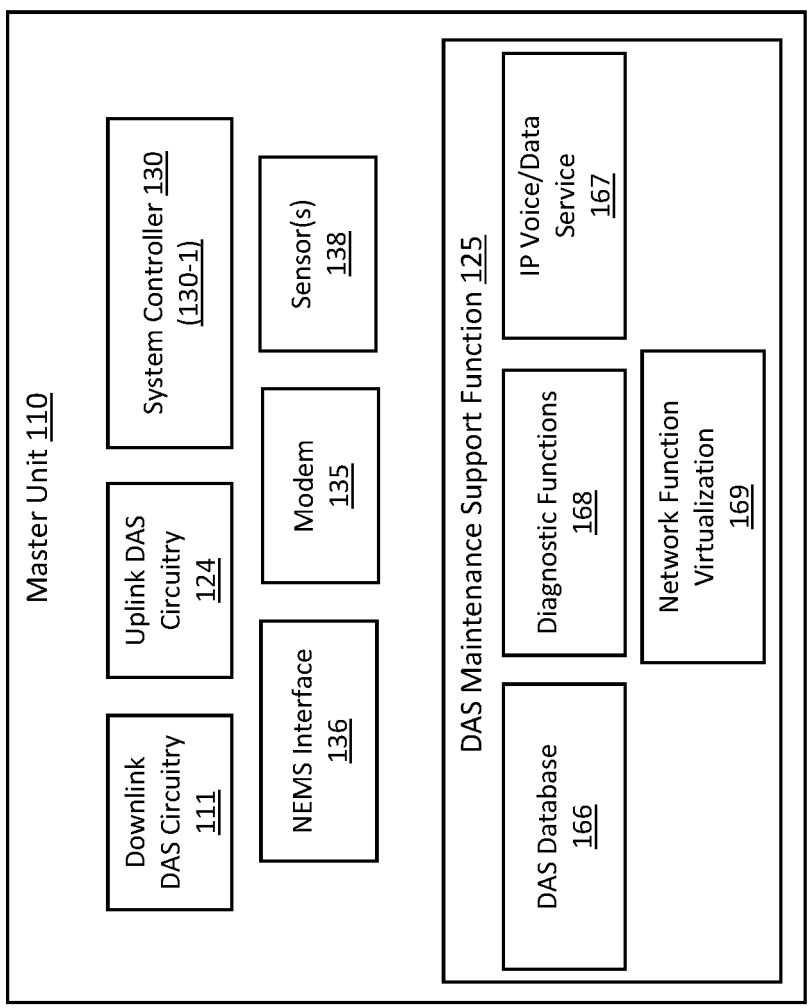
FIG. 1A, is a block diagram illustrating an example DAS master unit embodiment.

As shown in FIG. 1A, in general, master unit 110 comprises downlink DAS circuitry 111 that is configured to receive one or more downlink signals from the base stations 140. These signals are also referred to here as "base station downlink signals." Each base station downlink signal includes one or more radio frequency channels used for communicating in the downlink direction with user equipment (UE) 116 (which may include cellular phones, tablets, and other mobile user devices, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocols). The downlink DAS circuitry 111 in each master unit 110 is also configured to generate one or more downlink transport signals derived from one or more base station downlink signals and to transmit one or more downlink transport signals to one or more of the remote antenna units 112.

Figure 1C:
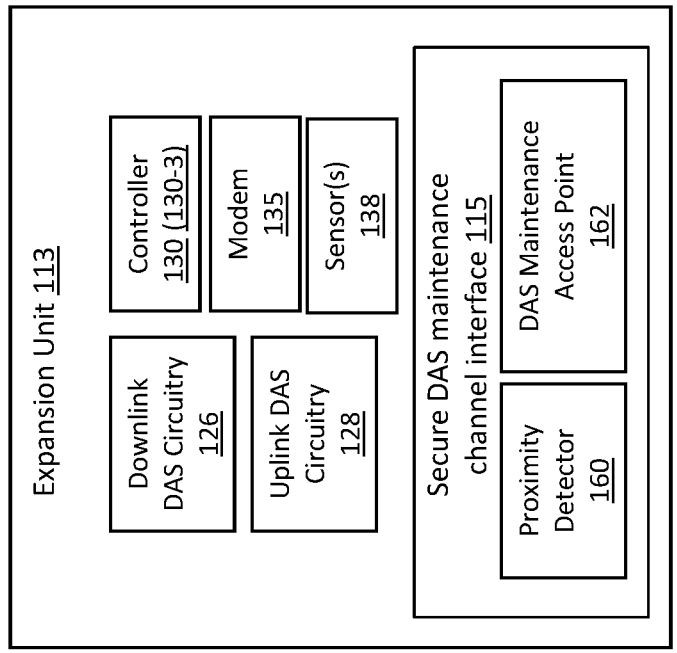
FIG. 1C, is a block diagram illustrating an example DAS expansion unit embodiment.
Figure 1B:
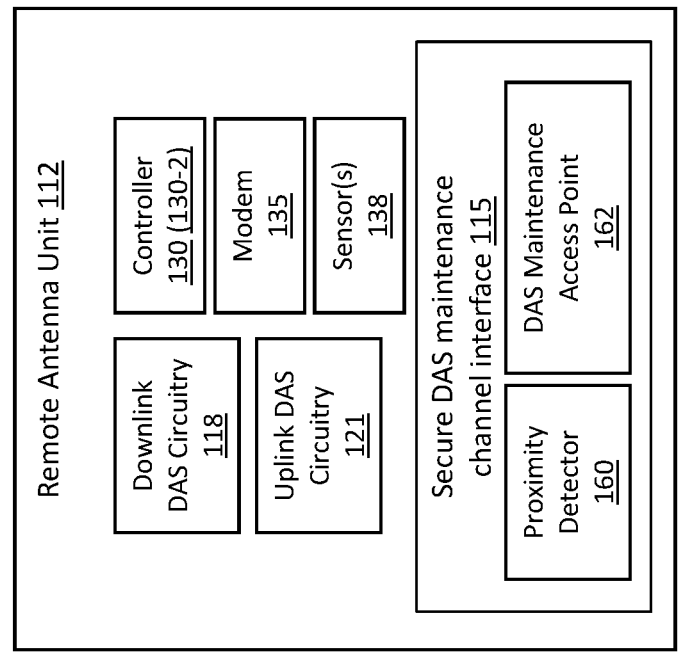
FIG. 1B, is a block diagram illustrating an example DAS remote antenna unit embodiment.

As shown in FIG. 1B, each remote antenna unit 112 comprises downlink DAS circuitry 118 that is configured to receive the downlink transport signals transmitted to it from the master unit 110 and to use the received downlink transport signals to generate one or more downlink radio frequency signals that are radiated from one or more antennas 119 associated with that remote antenna unit 112 for reception by UEs 116. These downlink radio frequency signals are analog radio frequency signals and are also referred to here as "remote downlink radio frequency signals." Each remote downlink radio frequency signal includes one or more of the downlink radio frequency channels used for communicating with UEs 116 over the wireless air interface. In this way, the DAS 100 increases the coverage area for the downlink capacity provided by the base stations 140. Also, each remote antenna unit 112 comprises uplink DAS circuitry 121 that is configured to receive via antenna 119 one or more uplink radio frequency signals transmitted from the UEs 116. These signals are analog radio frequency signals and are also referred to here as "remote uplink radio frequency signals." Each uplink radio frequency signal includes one or more radio frequency channels used for communicating in the uplink direction with UEs 116 over the relevant wireless air interface. The uplink DAS circuitry 121 in each remote antenna unit 112 is configured to generate one or more uplink transport signals derived from the one or more remote uplink radio frequency signals and to transmit one or more uplink transport signals to one or more of the master units 110.

Each master unit 110 comprises uplink DAS circuitry 124 that is configured to receive the respective uplink transport signals transmitted to it from one or more remote antenna units 112 and to use the received uplink transport signals to generate one or more base station uplink radio frequency signals that are provided to the one or more base stations 140 associated with that master unit 110. Typically, this involves, among other things, combining or summing uplink signals received from multiple remote antenna units 112 in order to produce the base station signal provided to each base station 140. Each base station uplink signal includes one or more of the uplink radio frequency channels used for communicating with UEs 116 over the wireless air interface. In this way, the DAS 100 increases the coverage area for the uplink capacity provided by the base stations 140.

As shown in FIG. 1C, each expansion unit 113 comprises downlink DAS circuitry 126 that is configured to receive the downlink transport signals transmitted to it from the master unit 110 (or other expansion unit 113) and transmits the downlink transport signals to one or more remote antenna units 112 (or other downstream expansion unit 113). Each expansion unit 113 comprises uplink DAS circuitry 128 that is configured to receive the respective uplink transport signals transmitted to it from one or more remote antenna units 112 or other downstream expansion unit 113, combine or sum the received uplink transport signals, and transmit the combined uplink transport signals uplink to the master unit 110 or other expansion unit 113. In other embodiments, one or more remote antenna units 112 are coupled to the master unit 110 via one or more other remote antenna units 112 (for examples, where the remote antenna units 112 are coupled together in a daisy chain or ring topology). In such an embodiments, an expansion unit 113 may be implemented using a remote antenna unit 112.

The downlink DAS circuitry 111, 118, and 126 and uplink DAS circuitry 124, 121, and 128 in each master unit 110, remote antenna unit 112, and expansion unit 113, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 111, 118, and 126 and uplink DAS circuitry 124, 121, and 128 may share common circuitry and/or components. For example, some components (such as duplexers)

by their nature are shared among the downlink DAS circuitry 111, 118, and 126 and uplink DAS circuitry 124, 122, and 128.

The DAS 100 can use either digital transport, analog transport, or combinations of digital and analog transport for generating and communicating the transport signals between the master units 110, the remote antenna units 112, and any expansion unit 113. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 110 and the remote antenna units 112), or combinations of analog and digital transport.

Each unit 110, 112, 113 in the DAS 100 also comprises a respective controller (a master controller shown as 130-1, a remote antenna unit controller shown as 130-2, and an intermediary unit controller 130-3) any of which may be referred to generally herein as controller 130. Each controller 130 may be implemented using one or more programmable processors that execute software that is configured to implement the various features described here as being implemented by the controller 130. Each controller 130 (and the various features described here as being implemented by a controller 130) can be implemented in other ways (for example, in a field programmable gate array (FPGA), application specific integrated circuit (ASIC), etc.). Each controller 130 is configured to monitor and control the operation of the associated unit. Each controller 130 is also configured to send and receive management data with other controllers 130 over the DAS 100 via a maintenance channel established over the cables 114. In one embodiment, each unit 110, 112, 113 in the DAS 100 also comprises a modem 135 that is configured to send and receive management data over the maintenance channel of the DAS 100 by modulating and demodulating one or more carrier frequencies. In some embodiments (for example, where digital transport is used in the DAS), a separate modem 135 for modulating and demodulating management data is not used and, instead, the management data is combined with the digital DAS transport data before being supplied to the transport transceiver or other physical layer device.

Figure 2:
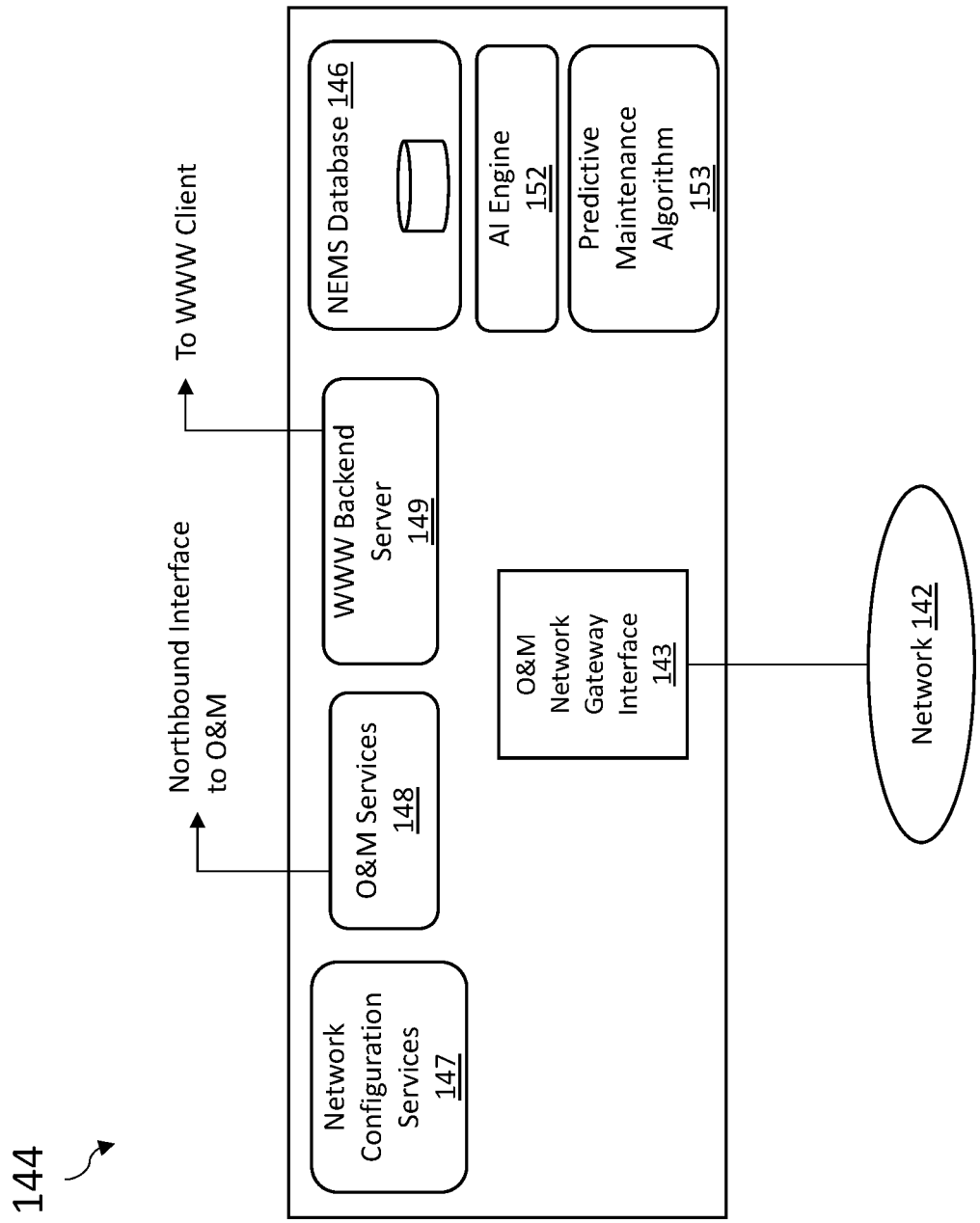
FIG. 2 is a block diagram illustrating an example network element management system embodiment.

As shown in FIG. 1A, in some embodiments, the master unit 110 comprises a NEMS interface 136 which may be used to couple the DAS 100 to the NEMS 144 via network 142. In some embodiments, NEMS interface 136 comprises either a wired Ethernet interface or a wireless interface. FIG. 2 illustrates one possible implementation of a NEMS 144. In this figure, the NEMS 144 comprises a gateway interface 143 coupled to the network 142 in order to establish a communications link with the NEMS interface 136 of DAS 100. In some embodiments, such as shown in FIG. 2, the NEMS 144 may further comprise one or more servers or network nodes in addition to the NEMS database 146. Such servers and/or network nodes may comprise processors that implement, for example, network configuration services 147, an internet World Wide Web (WWW) backend server 149 or a northbound interface (NBI) to operations and maintenance services 148 with which the DAS operator may interact with, and control, any aspects of the DAS 110.

As discussed above, one or more of the embodiments of the present disclosure provide DAS maintenance support functionality to technicians working locally within the coverage area of the DAS 100. This functionality serves to facilitate accomplishing tasks utilizing the DAS 100's infrastructure during scenarios where the transport of communications signals between the master unit 110 and the base station 140 may not be available. According to some embodiments, one or more of the remote antenna units 112 and/or expansion units 113 of the DAS 100 may comprise a secure DAS maintenance channel interface 115. The secure DAS maintenance channel interface 115 includes a wireless communications DAS maintenance access point 162 through which a Technician User Equipment (TUE) 117 may access a DAS Maintenance Support Function 125 in the master unit 110. Communication between the secure DAS maintenance channel interface 115 and DAS Maintenance Support Function 125 may be conducted over a maintenance channel of the DAS 100 carried by cables 114. This maintenance channel may utilize a wireline protocol such as, but not limited to, Ethernet or similar protocol. A similar maintenance channel may be used for communication between with the NEMS 144 and the DAS Maintenance Support Function 125. Communication between the TUE 117 and the secure DAS maintenance channel interface 115 may utilize a wireless protocol. For example, the secure DAS maintenance channel interface 115 may comprise an IEEE 802.11 (WiFi) type wireless communications access point, IEEE 802.15 (Bluetooth/wireless personal area network (WPAN) technology) access point, or implement an access point for the TUE 117 using another wireless technology.

In some embodiments, the DAS Maintenance Support Function 125 may at least in part be implemented through code executed by the main system controller 130-1 of the master unit 110. A TUE 117 is distinguishable from a UE 116 in that a TUE 117 is used by technicians for the purpose of accessing the DAS Maintenance Support Function 125 or other functions executed by the controllers 130, and/or or accessing the NEMS 144. However, it should be understood that in some embodiments, TUE 117 may optionally include circuits to implement the functionality of the UE 116 in order to exchange voice and/or data communications between the technician and the base station 140 via the standard DAS 100 uplink and downlink communications paths.

In some embodiments, secure DAS maintenance channel interface 115 is only discoverable to mobile equipment when an authorized TUE 117 is within a defined proximity of the DAS 100. In some embodiments, the defined proximity may be defined based on the coverage area of the remote antenna unit 112 or expansion unit 113 that comprises the secure DAS maintenance channel interface 115. In some embodiments, the secure DAS maintenance channel interface 115 may comprise, or otherwise communicate with, a proximity detector 160 which can detect the presence of an authorized TUE 117 within a predefined distance of the secure DAS maintenance channel interface 115. When the proximity detector 160 detects such an authorized TUE 117, then the discoverability of the secure DAS maintenance channel interface 115 is enabled to allow the TUE 117 to access the DAS Maintenance Support Function 125. For example, in some embodiments the proximity detector 160 may be implemented by one or more beacon receivers. In such an embodiment, the TUE 117 is equipped to transmit a beacon signal that is received by the proximity detector 160. The beacon signal (which may be an encrypted signal) may carry a code that identifies the TUE 117 as authorized to access the secure DAS maintenance channel interface 115. In some embodiments, the code that identifies the TUE 117 may be unique to that specific TUE 117 device. In other embodiments, the TUE 117 may include a Radio Frequency Identification (RFID) tag or other Near Field Communications (NFC) interface that may be queried by the proximity detector 160 and that provides a response signal that carries the code that identifies the TUE 117 as authorized to access the secure DAS maintenance channel interface 115. This code that identifies the TUE 117 may be referred to herein as the "TUE ID code".

In some embodiments, the TUE ID code received by the secure DAS maintenance channel interface 115 is transmitted to the master controller 130-1 which contacts the network element management system 144 to determine if the TUE ID code is associated with a TUE 117 that is authorized to obtain access the DAS Maintenance Support Function 125 via the DAS maintenance channel interface 115. If the TUE 117 is identified back to the master controller 130-1 as authorized to maintenance access the DAS Maintenance Support Function 125 and/or one or more of the controllers 130, then the master controller 130-1 sends a control signal to the secure DAS maintenance channel interface 115 that enables discovery of the wireless maintenance interface by the TUE 117. For example, enabling the discovery of the secure DAS maintenance channel interface 115 may comprise enabling the broadcast of an service set identifier (SSID) signal from the access point 162 of the secure DAS maintenance channel interface 115, enabling Bluetooth discoverable mode, or enabling another wireless signal service that would permit TUE 117 to recognize and exchange communications signals with the secure DAS maintenance channel interface 115.

The user of the TUE 117 may then enter his credentials (using, for example, his userid and password, fingerprint, iris scan, retina scan, facial recognition scan, or other biometric scan or other personal authentication technology) to identify himself as an authorized user and obtain access to the DAS Maintenance Support Function 125 and/or other maintenance and management functions provided by the master controller 130-1. In some embodiments, the NEMS 144 maintains within the NEMS database 146 the TUE ID code for those TUE 117 devices authorized to use the secure DAS maintenance channel interface 115 of the DAS 100. In some embodiments, the authorization process executed by the NEMS 144 may further include confirming if the TUE 117 requesting access is listed on a currently open work order prior to identifying back to the master controller 130-1 that the TUE 117 is authorized to gain access through the secure DAS maintenance channel interface 115. In some embodiments, for example where the maintenance channel between the master controller 115 and the NEMS 144 is unavailable, the master controller 130-1 may instead have access to a local DAS database 166 that includes a table of TUE ID codes for one or more TUE 117s authorized to access the secure DAS maintenance channel interface 115. In such a case, the TUE ID code is compared by the master controller 130-1 to the local DAS database 166 to determine if the TUE ID code received from a TUE 117 is associated with a TUE 117 authorized to access the secure DAS maintenance channel interface 115. If the TUE 117 is identified by the master controller 130-1 as authorized to access the DAS Maintenance Support Function 125 and/or other maintenance and management functions provided by the master controller 130-1, then the master controller 130-1 sends the control signal to enables discovery of the secure DAS maintenance channel interface 115 by the TUE 117 as described above.

In this way, the secure DAS maintenance channel interface 115 remains undetectable until such time as an TUE 117 enters the proximity of the DAS 100. Once granted access, the TUE 117 may utilize the secure DAS maintenance channel interface 115 of the DAS 100 to use the features of the DAS Maintenance Support Function 125 in order to perform configuration, calibration, and/or maintenance tasks.

Figure 3:
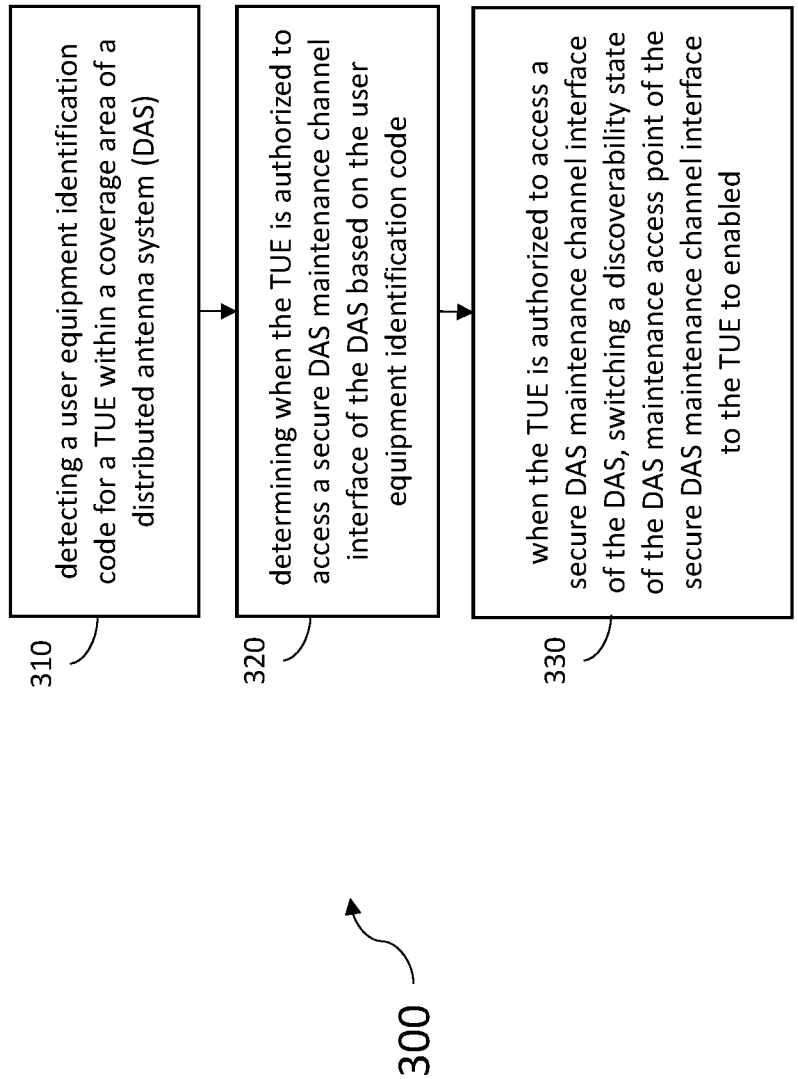
FIG. 3 is a block diagram illustrating an example method embodiment.

FIG. 3 is a flow chart illustrating an example method 300 for an authorization process for obtaining maintenance access to a DAS (such as DAS 100, for example). It should be understood that the features and elements described herein with respect to the method 300 shown in FIG. 3 and the accompanying description may be used in conjunction with, in combination with, or substituted for elements of any of the other embodiments discussed with respect to the other figures, or elsewhere herein, and vice versa. Further, it should be understood that the functions, structures, and other description of elements associated with embodiments of FIG. 3 may apply to like named or described elements for any of the other figures and embodiments and vice versa.

The method begins at 310 with detecting a user equipment identification code for a TUE within a coverage area of a distributed antenna system (DAS). In some embodiments, the DAS may comprise, or otherwise communicate with, a proximity detector which can detect the presence of a TUE within a predefined distance of the DAS and obtain the user equipment identification code from the UE. As discussed above, in alternate embodiments, the proximity detector can be implemented using one or more beacon receivers, Radio Frequency Identification (RFID) tag readers, or other Near Field Communications (NFC) interfaces, that can query and/or read the user equipment identification code from the TUE.

The method proceeds to 320 with determining when the TUE is authorized to access a secure DAS maintenance channel interface of the DAS based on the user equipment identification code. In some embodiments, the DAS (for example a master controller of the master unit) may be in communication with a network element management system that maintains a database storing the user equipment identification codes for TUEs authorized to use the secure DAS maintenance channel interface of the DAS. In some embodiments, the authorization process may further include confirming if the TUE requesting access is authorized per a currently open work order to work on and access the secure DAS maintenance channel interface. In some embodiments, the DAS (for example, the master controller of the master unit) instead has access to a local DAS database that includes a table of the user equipment identification codes authorized to access the secure DAS maintenance channel interface 115.

The method proceeds to 330 with when the TUE is authorized to access a secure DAS maintenance channel interface of the DAS, switching a discoverability state of the DAS maintenance access point of the secure DAS maintenance channel interface to the TUE to enabled. Switching the discoverability state may comprise switching from a disabled state to an enabled state. In some implementations, if the discoverability state happens to already be in an enabled state, the switching maintains the discoverability state in the enabled state.

For example, the master controller may send a control signal to the secure DAS maintenance channel interface to enable discovery of a DAS maintenance access point. For example, enabling the discovery of the secure DAS maintenance channel interface may comprise enabling the broadcast of an service set identifier (SSID) signal from the DAS maintenance access point, enabling Bluetooth discoverable mode, or enabling another wireless signal service that would permit the TUE to recognize and exchange communications signals with the secure DAS maintenance channel interface. In some embodiments, the user of the TUE may then enter his credentials to identify himself as an authorized user. In some embodiments, once the TUE is granted access to the DAS maintenance support function through the secure DAS maintenance channel interface, the discoverability state of the DAS maintenance access point may then be disabled. That is, the TUE may continue to communicate with the DAS maintenance support function over the now established DAS maintenance channel to the master unit 110, but the DAS maintenance point will no longer be discoverable to other UEs, unless they too are authorized per this process based on their respective user equipment identification code. In other embodiments, once enabled, the discoverability of the DAS maintenance access point may be maintained for a predetermined time duration.

Once granted access to utilize the secure DAS maintenance channel interface 115, various communications and maintenance functions may be made available to the TUE 117. For example, once granted access to utilize the secure DAS maintenance channel interface 115, the TUE 117 may establish a communications link with another technician using a different TUE 117 or another device that is communicating with the DAS 100, or with another technician logged into the NEMS 144 (for example, through an internet protocol (IP) voice/data service 167 of the DAS Maintenance Support Function 125). The IP voice/data service 167 may instead establish a communications link via the gateway 150. For example, in one embodiment, the TUE 117 can access an operations and maintenance channel communications link between the secure DAS maintenance channel interface 115 and the DAS Maintenance Support Function 125 as described above and send commands to the DAS Maintenance Support Function 125 initiate the IP voice/data service 167 with the desired user. The IP voice/data service 167 may then establish a human-to-human communications channel, for example using Web Real-Time Communication (WebRTC) voice/data via IP packets between the technician at the TUE 117 and a person at network element management system 144 or elsewhere. The technician may then use the channel to talk with the other person via the TUE 117 using a secure link in system for troubleshooting, coordinating, planning, and the like, even when connectivity between the base station 140 and master unit 110 is not available.

Moreover, the technician at the TUE 117 can access the NEMS database 146, or another database, containing system planning data to obtain information needed to complete one or more task. For example, the technician at the TUE 117 can obtain information about the target configuration of DAS 100. This information may include configuration information such as, but not limited to: documents specifying provided services at a given location, target power levels of RF signals transmitted by remote antenna units 112, signal quality, transmission rate, and similar parameters, work orders specifying planned configuration changes, service re-configuration and/or hardware extensions. In some embodiments, the user of TUE 117 can access a database containing operational data of the DAS 100. For example, the technician using TUE 117 can trigger the capture of measurement data from sensors 138 in the DAS 100 that can be uploaded to the to the NEMS database 146. Alternatively, the technician using TUE 117 can retrieve historical sensor data from the NEMS database 146 in order to compare current measurements with the historical measurements. Sensors 138 may include devices that read, measure, and/or record various conditions of DAS 100 or its surrounding ambient environment, such as but not limited to: temperature sensors; humidity or moisture sensors; sensors that measure electrical current flow, voltage or power levels, resistances, grounds or shorts; clocks or counters that measure a component's time in operation or number of operating cycles; sensors that measure vibration or noise level, for example.

In some embodiments, the NEMS 144 may comprise an artificial intelligence (AI) engine 152 that evaluates captured measurement data received from the sensors 138 of DAS 100 and stored in the NEMS database 146 in order to identify characteristic changes in measurement data that are indicative of degrading DAS hardware. Such predictive maintenance techniques using sensor data collected from the DAS 100 can be used to determine when hardware component of the DAS need to be replaced prior to their reaching the point of operational degradation. Based on the determinization, identified components can be scheduled for replacement during regularly scheduled maintenance windows instead of during unplanned emergency maintenance or system failures.

In one embodiment, a predictive maintenance algorithm 153 may be executed by the AI engine 152 (or other component of the NEMS 144) that evaluates the captured measurement data and make predictive maintenance determinations or statistics for one or more components of the DAS 100 based on the measurement data and other known factors relevant to the specific components. For example, the predictive maintenance algorithm 153 may retrieve baseline Mean Time Between Failure (MTBF) for each of the components monitored by the predictive maintenance algorithm 153. For example, such MTBF data may be obtained from equipment vendor information and/or stored in the NEMS database 146. Such data may represent a statistical expected lifetime for each component under nominal operating conditions. In one embodiment, the predictive maintenance algorithm 153 may perform an MTBF calculation for each component that takes into account factors that can influence the actual expected lifetime given the conditions under which the component actually operates. For example, given measurement data indicating the operating temperature, current consumption, counter values (for example, a count of how many times a component has cycled between states, such as how many times a relay has switched during its lifetime) calculations known to those skilled in the art may be employed by the predictive maintenance algorithm 153 to calculate (and periodically recalculate) how much these factors may cause a specific monitored component to deviate in MTBF from the baseline MTBF. For example, relatively higher operating temperatures can be expected to lower a components MTBF. Similarly, a relatively higher current drawn by an electrical component can be expected to lower a components MTBF. Therefore, a component specific MTBF may, for example, reveal that a component may be expected to reach end-of-life either sooner, or later than, expected from the baseline MTBF. Maintenance for replacing that component may then be scheduled during a scheduled DAS downtime event prior to its expected failure based on the component specific MTBF. At the same time, unnecessary expenses from replacing the component more frequently than necessary can also be avoided. Moreover, the loss of coverage due to failed components can be substantially avoided.

In some embodiments, the predictive maintenance algorithm 153 may utilize captured measurement data in conjunction with repair statistics. As an example, as components of the DAS are returned to the factory with a defect, the component manufacturer can perform statistics to determine what components in the component fails more often than others. The predictive maintenance algorithm 153 can then evaluate for that component the captured measurement data (such as environmental parameters like outside- or room-temperature data, moisture data) most relevant to causing its failure and/or observe how much the DAS is operated near or above its designed environmental limits.

In some embodiments, the predictive maintenance algorithm 153 may calculate and output a prediction of a remaining expected service lifetime for a monitored component. The prediction of the remaining expected service lifetime may be sent to a network operation center via the NEMS 144. For example, the predictive maintenance algorithm 153 may predict that a component will either enter a degraded state, or fail, in approximately 20 days. Maintenance technicians can then review the next planned regular maintenance to see if it is scheduled early enough that the component can be replace before it becomes degraded or fails. In some embodiments, a work order ticket system may input the remaining expected service lifetime information from the predictive maintenance algorithm 153 and automatically generate a work order ticket for replacing the component.

If the component is likely to fail prior to the next regular maintenance, in some instances the settings for the component may be adjusted (via the NEMS, for example) to attempt to further extend the lifetime of the component to reach the next regular maintenance. For example, the RF output power level of an amplifier may be lowered to curtail the amount of heat produced by the amplifier, which may service to delay the amplifier's failure. Such an adjustment may keep the DAS 100 operational, even if overall system performance partially degraded. Other adjustments may include adjustments to environmental parameters, for example decreases the room temperature by switching on air conditioning or lowering the target temperature.

In some embodiments, data such as manuals, videos, or other technical support documents can be accessed by the DAS Maintenance Support Function 125 and served to the TUE 117. In some embodiments, DAS Maintenance Support Function 125 can provide the technician using TUE 117 with access to a work order ticket system located at the NEMS 144, in order to view or download work order instructions, or to submit a new work order ticket request, or to otherwise document existing field conditions or configurations.

In some embodiments, access to the DAS Maintenance Support Function 125 permits the technician using TUE 117 to initiate one or more diagnostic function 168 in order to test and/or calibrate RF signal settings and parameters. For example, optimizing RF signal coverage within the facility where the DAS 100 is installed is typically performed by utilizing a downlink signal generated by the base station 140 and received by the master unit 110. A technician with dedicated mobile test equipment would walk around the facility while the test equipment measures and record RF levels of the downlink signal as received from the transmissions of the remote antenna units 112.

However, in some scenarios, such as during a DAS deployment as an example, communications with the base station 140 may not be available so that the DAS 100 cannot receive the downlink signal from the base station 140. For such scenarios, in some embodiments the DAS Maintenance Support Function 125 further executes a network function virtualization 169 that emulates a virtual core network connected to the DAS 100. For example, the virtual core network emulated by the network function virtualization 169 may provide an output to the downlink DAS circuitry 111 (e.g., an emulated base station downlink signal) that mimics the reception of a base station downlink signal from the base station 140 at times when such a signal might not actually be available. Similarly, the virtual core network emulated by the network function virtualization 169 may receive an input from the uplink DAS circuitry 124 in response to base station uplink signals received by the uplink DAS circuitry 124 from one or more of the remote antenna units 112. In some embodiments, the emulated base station downlink signal may include test communications traffic. For example, the technician using TUE 117 can access the diagnosis functions 168 to activate the network function virtualization 169. The network function virtualization 169 injects the emulated base station downlink signal into the downlink DAS circuitry 111, which accepts the emulated base station downlink signal and processes it in the same manner as it would an actual base station downlink signal received from the base station 140. The emulated base station downlink signal is thus transported from the master unit 110 to the remote antenna units 112 in the same manner that real-time communications traffic would be transported, and transmitted into the coverage area of the DAS 110. In such an embodiment, the technician with TUE 117 may walk about the facility while the TUE 117 measures and records RF levels of the emulated base station downlink signal as received from the transmissions of the remote antenna units 112 and/or the throughput (for example, data rates, effective bandwidths) of the emulated traffic carried by the emulated base station downlink signal. Moreover, the TUE 117 may respond to the emulated base station downlink signal in the same manner as if it were communicating with an actual base stations, which may result in producing the base station uplink signals (in the same manner that real-time communications traffic would be generated) which may be received by the virtual core network via the uplink DAS circuitry 124. In one embodiment, a test may be performed using the network function virtualization 169 that comprises the download of IP packets from the network function virtualization 169 to the TUE 117. Another test may be performed comprising the upload of IP packets from the TUE 117 to the network function virtualization 169. Such testing may thus be utilized to optimize and document the network performance (for example, the achieved data rates) in both the downlink and uplink directions. The IP packets can simulate any form of data transfer such as, but not limited to, files and or streaming data (such as streaming video, for example). In some embodiments, the TUE 117 may be programmed with simulated RF coverage data (for example, a map of the theoretically optimal RF coverage of DAS 100 for the facility) and the TUE 117 may compare the actual RF signal and throughput measurements against the simulated data to verify the accuracy of the simulation data, and/or determine when an RAU 112 relocation or gain adjustment is desired to obtain optimal RF coverage from the DAS 100.

Although in some embodiments an emulated base station downlink and uplink signals may be communicated between the master unit 110 and the NEMS 144, there may be advantages to instead activate the network function virtualization 169 to inject the emulated base station downlink signal into the downstream path of the DAS 100, and receive the emulated base station uplink signal from the upstream path of the DAS 100. For example, there may be latency or signal quality issues that adversely affect the transmission of an emulated base station downlink signal from the NEMS 144 to the master unit 110. For example, the network 142 may include a connection through the public Internet where packet transmission delays can be caused by myriad sources, leading to instability in reception of the emulated base station downlink signal in a manner that may cause the DAS 100 to erroneously appear to be sub-optimally tuned when tested using a TUE 117 as described above. Emulated base station communications between a TUE 117 and the network function virtualization 169 of the DAS Maintenance Support Function 125 (which may comprise both base station downlink and uplink signals) eliminates the need for having any offsite communication link and provides for a stable emulated base station downlink signal for more accurate RF signal optimization measurements.

In other embodiments, quality determinations may be obtained in other ways from, or in addition to, utilizing a network function virtualization 169 that emulates a virtual core network connected to the DAS 100. For example, specific reference signals may be generated and transmitted that are used to estimate the quality of signal reception at the TUE 117 and/or the master unit 110. Such reference signals may comprise, for example, Code-Division Multiple Access (CDMA) or Orthogonal Frequency Division Multiplexing OFDM coded signals, or signals of any other RF modulation scheme. In one embodiment, the diagnostic functions 168 or other element of the master unit 110 may initiate the transmission of a downlink reference signal into the downlink path of the DAS 100 that is received at the TUE 117. Similarly, an application on the TUE 117 may initiate the transmission of an uplink reference signal into the uplink path of the DAS 100 that is received at the diagnostic functions 168 or other element of the master unit 110. In one embodiment, such an exchange of downlink and uplink reference signals may be used to measure quality-of-service (QOS) parameters and round-trip delay or another parameter. In one embodiment, the master unit 110 and TUE 117 equipment receiving the respective uplink and downlink reference signals can evaluate the signals as received for a quality-of-service (QOS) parameter such as, Error Vector Magnitude (EVM) or a bit error rate for a given Quadrature amplitude modulation (QAM) constellation, or consider aspects of interference, multipath propagation, and other factors that will impact EVM, and thus the transmission rate.

EXAMPLE EMBODIMENTS

Example 1 includes a distributed antenna system (DAS), the system comprising: a master unit having downlink DAS circuitry configured to receive a base station downlink radio frequency signal from a base station, and uplink DAS circuitry configured to transmit a base station uplink radio frequency signal to the base station; and a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna; wherein a first remote antenna unit of the plurality of remote antenna units includes a secure DAS maintenance channel interface that includes a DAS maintenance access point, wherein the secure DAS maintenance channel interface is communicatively coupled to a DAS maintenance channel of the DAS; wherein the secure DAS maintenance channel interface communicates with a proximity detector configured to obtain a user equipment identification code from a user equipment; wherein a discoverability of the DAS maintenance access point is enabled based on the user equipment identification code.

Example 2 includes the system of Example 1, wherein the proximity detector is configured to obtain the user equipment identification code from the user equipment when the user equipment is within a predetermined proximity of the DAS.

Example 3 includes the system of any of Examples 1-2, wherein the master unit comprises a system controller coupled to a network element management system through a network, wherein the system controller communicates with the network element management system to determine when the user equipment is authorized to access the secure DAS maintenance channel interface based on the user equipment identification code.

Example 4 includes the system of any of Examples 1-3, wherein the master unit comprises a system controller coupled to a database, wherein system controller accesses the database to determine when the user equipment is authorized to access the secure DAS maintenance channel interface based on the user equipment identification code.

Example 5 includes the system of any of Examples 1-4, further comprising at least one expansion unit coupled to the master unit and at least one remote unit of the plurality of remote units; wherein at least one expansion unit includes a secure DAS maintenance channel interface that includes a DAS maintenance access point, wherein the secure DAS maintenance channel interface is communicatively coupled to the DAS maintenance channel of the DAS; wherein the secure DAS maintenance channel interface of the at least one expansion unit communicates with a proximity detector configured to obtain a user equipment identification code from a user equipment; wherein a discoverability of the DAS maintenance access point of the expansion unit is enabled based on the user equipment identification code.

Example 6 includes the system of any of Examples 1-5, wherein the master unit comprises a system controller executing a DAS maintenance support function, wherein the secure DAS maintenance channel interface is communicatively coupled to the DAS maintenance support function by the DAS maintenance channel.

Example 7 includes the system of Example 6, wherein the DAS maintenance support function comprises one or more diagnostic functions, wherein the secure DAS maintenance channel interface provides user equipment access to the one or more diagnostic functions over the DAS maintenance channel.

Example 8 includes the system of any of Examples 6-7, wherein the DAS maintenance support function comprises an internet protocol voice and data service.

Example 9 includes the system of Example 8, wherein the internet protocol voice and data service are configured to establish a voice and data communication link between the user equipment and a communications gateway.

Example 10 includes the system of any of Examples 8-9, wherein the internet protocol voice and data service are configured to establish a voice and data communication link between the user equipment and a network element management system.

Example 11 includes the system of any of Examples 6-10, wherein the DAS maintenance support function comprises network function virtualization configured to emulate a virtual core network connected to the DAS.

Example 12 includes the system of Example 11, wherein the network function virtualization transmits an emulated base station downlink signal and processes an emulated base station uplink signal.

Example 13 includes the system of Example 12, wherein the network function virtualization outputs the emulated base station downlink signal to the downlink DAS circuitry; and wherein the network function virtualization receives and processes the emulated base station uplink signals from the uplink DAS circuitry.

Example 14 includes the system of Example 13, wherein the emulated base station downlink signal and emulated base station uplink signal each include test communications traffic.

Example 15 includes the system of any of Examples 13-14, wherein the DAS maintenance support function receives measurement data from the user equipment representing measurements based on the emulated base station downlink signal Example 16 includes the system of any of Examples 6-15, wherein the DAS maintenance support function transmits measurement data from sensors in the DAS to a network element management system; wherein the network element management system evaluates captured measurement data received from the DAS in order to identify characteristic changes in measurement data that are indicative of degrading DAS hardware.

Example 17 includes the system of Example 16, wherein the network element management system comprises a predictive maintenance algorithm implemented by an artificial intelligence engine, wherein the predictive maintenance algorithm evaluates the captured measurement data; wherein the predictive maintenance algorithm calculates and outputs a remaining expected service lifetime for at least one component for the DAS based on the evaluation of the capture measurement data.

Example 18 includes the system of Example 17, wherein the predictive maintenance algorithm outputs an indication of the remaining expected service lifetime for at least one component to a network operations center.

Example 19 includes the system of any of Examples 6-18, wherein the DAS Maintenance Support Function is configured to transmit a downlink diagnostic reference signal to the downlink DAS circuitry, and configured to determine a quality characteristic in response to a diagnostic reference signal received by the uplink DAS circuitry.

Example 20 includes a master unit for a distributed antenna system (DAS), the master unit coupled to a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna, the master unit comprising: downlink DAS circuitry configured to receive a base station downlink radio frequency signal from a base station; uplink DAS circuitry configured to transmit a base station uplink radio frequency signal to the base station; a controller executing a DAS maintenance support function that comprises network function virtualization configured to emulate a victual core network connected to the DAS; wherein the network function virtualization outputs an emulated base station downlink signal to the downlink DAS circuitry, wherein the plurality of remote antenna units each radiate their respective remote downlink radio frequency signal based on the emulated base station downlink signal; and wherein the network function virtualization receives and processes an emulated base station uplink signal received by the uplink DAS circuitry.

Example 21 includes the master unit of Example 20, wherein the emulated base station downlink signal and the emulated base station uplink signal each include test communications traffic.

Example 22 includes the master unit of any of Examples 20-21, wherein the master unit is communicatively coupled to a first remote antenna unit of the plurality of remote antenna units by a DAS maintenance channel of the DAS; wherein the master unit comprises a system controller coupled to a database, wherein the system controller accesses the database to determine when a user equipment is authorized to access the secure DAS maintenance channel interface based on a user equipment identification code read by a proximity detector configured to obtain a user equipment identification code from the user equipment; wherein the master unit enables a DAS maintenance access point based on the user equipment identification code.

Example 23 includes a method for obtaining wireless maintenance access to a Distributed Antenna System (DAS), the method comprising: detecting a user equipment identification code for a user equipment within a coverage area of a distributed antenna system (DAS); determining when the user equipment is authorized to access a secure DAS maintenance channel interface of the DAS based on the user equipment identification code; and when the user equipment is authorized to access a secure DAS maintenance channel interface of the DAS, enabling to the user equipment discoverability of a DAS maintenance access point of the secure DAS maintenance channel interface.

Example 24 includes the method of Example 23, further comprising: communicating with a proximity detector configured to detect a presence of the user equipment within a predefined distance of the DAS; and obtaining the user equipment identification code from the user equipment utilizing the proximity detector.

Example 25 includes the method of any of Examples 23-24, further comprising: confirming if the user equipment requesting access is authorized per a currently open work order to work on and access the secure DAS maintenance channel interface Example 26 includes the method of any of Examples 23-25, further comprising: disabling discoverability of the DAS maintenance access point based on a predetermined time duration after enabling discoverability of the DAS maintenance access point.

Example 27 includes the method of any of Examples 23-26, further comprising: disabling discoverability of the DAS maintenance access point based on receiving credentials of user of the user equipment that identify them as an authorized user.

Example 28 includes the method of any of Examples 23-27, further comprising: enabling access by the user equipment to a DAS maintenance support function via the secure DAS maintenance channel interface.

In various alternative embodiments, system and/or device elements, method steps, or example implementations described throughout this disclosure (such as any of the master units, remote antenna units, controllers, circuits, modems, network interfaces, detectors, sensors, attenuators, processors, base stations, transceivers, gateways, databases, DAS maintenance support function, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS related terms such as "master unit", "remote unit", "remote antenna unit", "controller", "circuit", "circuitry", "interface", "detector", "sensor", "attenuator", "processor", "base station", "transceiver", "gateway", "database", and "modem" refer to hardware elements that would be recognized and understood by those of skill in the art of wireless communications and are not used herein as generic placeholders, nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A distributed antenna system (DAS), the system comprising:
 a master unit having downlink DAS circuitry configured to receive a base station downlink radio frequency signal from a base station, and uplink DAS circuitry configured to transmit a base station uplink radio frequency signal to the base station; and
 a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna;
 wherein a first remote antenna unit of the plurality of remote antenna units includes a
 secure DAS maintenance channel interface that includes a DAS maintenance access point,
 wherein the secure DAS maintenance channel interface is communicatively coupled to a DAS maintenance channel of the DAS;
  wherein the secure DAS maintenance channel interface communicates with a proximity detector configured to obtain a user equipment identification code from a user equipment;
  wherein a discoverability of the DAS maintenance access point is enabled based on the user equipment identification code;
  wherein the proximity detector is configured to obtain the user equipment identification code from the user equipment when the user equipment is within a predetermined proximity of the DAS.

2. The system of claim 1, wherein the master unit comprises a system controller coupled to a network element management system through a network, wherein the system controller communicates with the network element management system to determine when the user equipment is authorized to access the secure DAS maintenance channel interface based on the user equipment identification code.

3. The system of claim 1, wherein the master unit comprises a system controller coupled to a database, wherein system controller accesses the database to determine when the user equipment is authorized to access the secure DAS maintenance channel interface based on the user equipment identification code.

4. The system of claim 1, further comprising at least one expansion unit coupled to the master unit and at least one remote unit of the plurality of remote units;
 wherein at least one expansion unit includes a secure DAS maintenance channel interface that includes a DAS maintenance access point, wherein the secure DAS maintenance channel interface is communicatively coupled to the DAS maintenance channel of the DAS;
 wherein the secure DAS maintenance channel interface of the at least one expansion unit communicates with a proximity detector configured to obtain a user equipment identification code from a user equipment;
 wherein a discoverability of the DAS maintenance access point of the expansion unit is enabled based on the user equipment identification code.

5. The system of claim 1, wherein the master unit comprises a system controller executing a DAS maintenance support function, wherein the secure DAS maintenance channel interface is communicatively coupled to the DAS maintenance support function by the DAS maintenance channel.

6. The system of claim 5, wherein the DAS maintenance support function comprises one or more diagnostic functions, wherein the secure DAS maintenance channel interface provides user equipment access to the one or more diagnostic functions over the DAS maintenance channel.

7. The system of claim 5, wherein the DAS maintenance support function comprises an internet protocol voice and data service.

8. The system of claim 7, wherein the internet protocol voice and data service are configured to establish a voice and data communication link between the user equipment and a communications gateway.

9. The system of claim 7, wherein the internet protocol voice and data service are configured to establish a voice and data communication link between the user equipment and a network element management system.

10. The system of claim 5, wherein the DAS maintenance support function comprises network function virtualization configured to emulate a virtual core network connected to the DAS.

11. The system of claim 10, wherein the network function virtualization transmits an emulated base station downlink signal and processes an emulated base station uplink signal.

12. The system of claim 11, wherein the network function virtualization outputs the emulated base station downlink signal to the downlink DAS circuitry; and wherein the network function virtualization receives and processes the emulated base station uplink signals from the uplink DAS circuitry.

13. The system of claim 12, wherein the emulated base station downlink signal and emulated base station uplink signal each include test communications traffic.

14. The system of claim 12, wherein the DAS maintenance support function receives measurement data from the user equipment representing measurements based on the emulated base station downlink signal.

15. The system of claim 5, wherein the DAS maintenance support function transmits measurement data from sensors in the DAS to a network element management system;
wherein the network element management system evaluates captured measurement data received from the DAS in order to identify characteristic changes in measurement data that are indicative of degrading DAS hardware.

16. The system of claim 15, wherein the network element management system comprises a predictive maintenance algorithm implemented by an artificial intelligence engine, wherein the predictive maintenance algorithm evaluates the captured measurement data;
wherein the predictive maintenance algorithm calculates and outputs a remaining expected service lifetime for at least one component for the DAS based on the evaluation of the capture measurement data.

17. The system of claim 16, wherein the predictive maintenance algorithm outputs an indication of the remaining expected service lifetime for at least one component to a network operations center.

18. The system of claim 5, wherein the DAS Maintenance Support Function is configured to transmit a downlink diagnostic reference signal to the downlink DAS circuitry, and configured to determine a quality characteristic in response to a diagnostic reference signal received by the uplink DAS circuitry.

19. A master unit for a distributed antenna system (DAS), the master unit coupled to a plurality of remote antenna units that are each communicatively coupled to the master unit using at least one cable, the plurality of remote antenna units each configured to radiate a remote downlink radio frequency signal from at least one antenna and to receive a remote uplink radio frequency signal from the at least one antenna, the master unit comprising:
downlink DAS circuitry configured to receive a base station downlink radio frequency signal from a base station;
uplink DAS circuitry configured to transmit a base station uplink radio frequency signal to the base station;
a controller executing a DAS maintenance support function that comprises network function virtualization configured to emulate a victual core network connected to the DAS;
wherein the network function virtualization outputs an emulated base station downlink signal to the downlink DAS circuitry, wherein the plurality of remote antenna units each radiate their respective remote downlink radio frequency signal based on the emulated base station downlink signal; and
wherein the network function virtualization receives and processes an emulated base station uplink signal received by the uplink DAS circuitry;
wherein the emulated base station downlink signal and the emulated base station uplink signal each include test communications traffic.

20. The master unit of claim 19, wherein the master unit is communicatively coupled to a first remote antenna unit of the plurality of remote antenna units by a DAS maintenance channel of the DAS;
wherein the master unit comprises a system controller coupled to a database, wherein the system controller accesses the database to determine when a user equipment is authorized to access the secure DAS maintenance channel interface based on a user equipment identification code read by a proximity detector configured to obtain a user equipment identification code from the user equipment;
wherein the master unit enables a DAS maintenance access point based on the user equipment identification code.

21. A method for obtaining wireless maintenance access to a Distributed Antenna System (DAS), the method comprising:
detecting a user equipment identification code for a user equipment within a coverage area of a distributed antenna system (DAS);
determining when the user equipment is authorized to access a secure DAS maintenance channel interface of the DAS based on the user equipment identification code; and
when the user equipment is authorized to access a secure DAS maintenance channel interface of the DAS, enabling to the user equipment discoverability of a DAS maintenance access point of the secure DAS maintenance channel interface;
disabling discoverability of the DAS maintenance access point based on receiving credentials of user of the user equipment that identify them as an authorized user.

22. The method of claim 21, further comprising:
communicating with a proximity detector configured to detect a presence of the user equipment within a predefined distance of the DAS; and
obtaining the user equipment identification code from the user equipment utilizing the proximity detector.

23. The method of claim 21, further comprising:
confirming if the user equipment requesting access is authorized per a currently open work order to work on and access the secure DAS maintenance channel interface.

24. The method of claim 21, further comprising:
disabling discoverability of the DAS maintenance access point based on a predetermined time duration after enabling discoverability of the DAS maintenance access point.

25. The method of claim 21 further comprising:
enabling access by the user equipment to a DAS maintenance support function via the secure DAS maintenance channel interface.

* * * * *